United States Patent [19]
Kusano et al.

[11] Patent Number: 5,480,672
[45] Date of Patent: Jan. 2, 1996

[54] PROCESS FOR MAKING PRESERVED EDIBLE FOODS FROM ROOTCROPS

[75] Inventors: Keigo Kusano, Komamoto; Osamu Matsunaga; Naomasa Hayashida, both of Tochigi, all of Japan

[73] Assignee: Mitsui Kouzan Kabushiki Kaisha, Tokyo, Japan

[21] Appl. No.: 25,287

[22] Filed: Mar. 2, 1993

[30] Foreign Application Priority Data

Mar. 2, 1992 [JP] Japan .................................... 4-081539

[51] Int. Cl.⁶ ........................................................ A23K 3/00
[52] U.S. Cl. ...................... 426/615; 426/443; 426/464; 426/465; 426/468; 426/18; 426/635; 426/637; 426/640; 426/45; 426/646; 426/658
[58] Field of Search ........................ 426/615, 635, 426/637, 640, 645, 646, 658, 443, 464, 465, 468, 518

[56] References Cited

U.S. PATENT DOCUMENTS

| | | | |
|---|---|---|---|
| 2,340,170 | 1/1944 | Baer | 426/465 |
| 3,527,642 | 9/1970 | Harrison et al. | 426/635 |

FOREIGN PATENT DOCUMENTS 0632112  12/1982  U.S.S.R. ............................ 426/637

*Primary Examiner*—Helen Pratt
*Attorney, Agent, or Firm*—David J. Archer

[57] ABSTRACT

A process for the production of an edible food supplement preservative from a rootcrop by processing such rootcrop into dry powder, the process steps including, placing the rootcrop in a closable vessel, subjecting the rootcrop to chopping or cutting while the vessel is evacuated, effecting a primary drying followed by the injection of an inert gas thereinto, crushing the rootcrop, spraying a synergist onto the crushed mass, spraying a drying distillation liquid thereonto, effecting a secondary drying of the resulting mass and mixing the dried mass to a dispersed state.

9 Claims, 3 Drawing Sheets

1-row material, 2-additives, 3-gas, 4-products, 5-warm water, 6-cool water, 7-vessel, 8-jacket, 9-upper mixing blade, 10-lower mixing blade, 11-motor, 12-inlet box, 13-outlet box, 14-spray nozzle, 15-vacuum guage, 16-to vacuum pump, 17-process controlling boad, 18-temparature cont rolling board, 19-rotation controlling board, Comparison of the Flow Chart of the Process for the Production of Edible Preservative Supplement between the Present Invention and the Prior Art 1-row material, 2-additives, 3-gas, 4-products, 5-warm water, 6-cool water, 7-vessel, 8-jacket, 9-upper mixing blade, 10-lower mixing blade, 11-motor, 12-inlet box, 13-outlet box, 14-spray nozzle, 15-vacuum guage, 16-to vacuum pump, 17-process controlling boad, 18-temparature cont rolling board, 19-rotation controlling board,

PROCESS FOR MAKING PRESERVED EDIBLE FOODS FROM ROOTCROPS

FIELD OF THE INVENTION

The present invention relates to a process for making preserved edible foods by processing rootcrops into dry powder without damaging the effective components thereof.

BACKGROUND OF THE INVENTION

For processing a raw material such as a vegetable or fruit into dry powder the process has been accomplished in the prior art by the process steps shown in the flow chart of FIG. 1. The process is accompanied by the following problems:

1) A large number of components and controls have been required due to the separate function of each individual component and control for each operational unit together with the necessary insertion of handling devices and buffer tanks between them.

2) The operation of such a large number of components and controls is labor intensive and involves considerable preventative maintainence.

3) Additionally the prior art arrangements require a higher capital investment and a relatively large operational site due to the installation of such a large number of components and controls.

4) The costs for the administration and operation of the aforementioned equipment is considerable.

5) A deterioration of the quality of the product is due to the process steps of cutting and slicing, handling and crushing of the raw materials due to air oxidation.

6) Due to the extended period of each handling and drying process step, the productivity is low and as such decreases the resultant quality of the product.

7) Product quality deterioration occurs due to the generation of heat during the crushing operation.

8) The processing components are sustained by the position of and the clinging thereto of the process material during the handling operation after the spraying thereon of the liquid additives.

9) Since the injection of the processing gas is carried out generally at ordinary pressure, there is some difficulty in obtaining sufficient permeation into the interior of the material being processed.

10) By gas injection, an objectionable odor is generated in the process material.

11) A preservative is employed for increasing the preservability or the durability of a food product as a whole, together with the primary raw materials of such food products. Many root crops possess a potential for being employed as preserved edible foods, however, root crops in general have irregular sizes and shapes and are not easily processed into commercial products. They are usually supplied from agricultural firms without the removal of petioles and stalks which have been discarded hitherto due to a lack of any viable processing technique even though they possess, in many cases, potential for being used also as preserved edible foods.

In order to accommodate the general demand for using a raw crop material as a preserved edible food, it has been necessary to process the raw material into a dry powdery form. In conventional techniques for such processing however, a deterioration of the quality of the product has occurred so that the product becomes unsuitable as a preserved edible food.

A preserved edible food is in itself a food product and should additionally have the properties of being preserved as well as the intrinsic properties of such food products, such as nutritional value, favorable taste, fragrance, biofuntionality controlling activity and so on. Thus, it is necessary for processing the raw material into a dry pulverous product to avoid any decomposition of the effective components of the raw material by heat or by oxidation during the drying process step and to prevent any deterioration of the product hue and fragrance.

Any deterioration in such properties will be increased when the temperature is higher and when the duration of exposure to the given temperature is longer. It is desirable to carry out the drying operation at a temperature which is as low as possible and for a duration which is as short as possible. However, in practice, many factors should be considered. For example, there are many possibilities including complex combinations of conditions, such as each specific raw material employed, the contemplated products quality, temperature, processing duration and so on. Also, choosing a practical operation among the various techniques of higher temperature/short period and lower temperature/long period present many possibilities.

Arrangements have been proposed in the prior art to improve the quality and to prevent the deterioration thereof, including a proposal for low temperature and shorter processing periods.

Technical means have been previously proposed for cutting the raw cut material into small sizes for facilitating the drying thereof by increasing the effective surface area of evaporation. Also agitation of the raw material and the elevation of the processing temperature have previously been employed generally with a view to attaining a short drying period. These measures exhibit a positive contribution by seeking to preserve the favorable properties of the raw material by the rapid drying thereof. However, a negative contribution has been introduced due to the mechanical processing of the raw material.

Freeze drying is superior in preserving the original properties of the raw crop material but is costly due to the high installation and operational costs. Therefor, freeze drying has found its application only in situations where other techniques can only be employed with difficulty.

Drying by hot air, which has been widely employed tends to suffer from an increase in cost relative to both installation and operation of the process where thermal deterioration of the product quality of the product is to be avoided. Such is the case because the operation of the process should be attained by warmer air at a relatively low temperature. There is a certain inherent limitation in achieving the prevention of deterioration of the product quality by oxygen and by heat even by operating in an optimum combination of drying temperature and drying time.

Drying by radiation such as irradiation by infrared or microwave radiation may be effective for short periods but, nevertheless, the product is liable to suffer from deterioration of product quality due to an increase in the temperature of the material by the heat generated therein.

Finally, vacuum drying which is useful for the prevention of deterioration of product quality due to the oxidation by air requires a longer period of time for the completion of the process. Such longer period has resulted in the installation of a large scale plant which increases operational costs for the heating and the maintainence of the vacuum.

One of the frustrating problems experienced in the standard techniques resides in the choice of which device or apparatus in view of the balance between the product quality, installation investment and operation costs. Such is so because, as discussed above, each drying technique has its own advantages and drawbacks.

The term "crusher" as employed herein, means a device for carrying out a primary crushing or rough crushing that attains production of "powder" product but not an ultrafine powder. However, there are a large variety of crushing devices each adapted for a specific purpose.

In order to prevent deterioration of the product quality, employment of a process having a shorter duration and lower temperature is essential. This requires cooling of the material during the processing, since any crushing is carried out by the generation of heat. Moreover, the crushing should be accomplished under an inert atmosphere or under vacuum for avoiding quality deterioration by oxidation. Though the crushing of the raw material does not constitute any critical process step, a product of higher quality will be obtained thereby. Low temperature vacuum crushing can be achieved at a cost comparable with conventional arrangements so long as the requirements for product quality are compromised with the installation cost.

OBJECTS AND SUMMARY OF THE INVENTION

In consideration of the above, the object of the present invention is to provide a novel technique for producing preserved edible foods from root crops. The technique enables the use of root crops having irregular sizes and shapes while permitting not only the advantage of preserving the food of the original raw crop material, but also avoiding any deterioration of the functional properties of the food. Additionally, by the inventive process, simultaneous utilization of the petioles and stalks of the root crop in the preserved edible food is achieved.

The above object is achieved by the process for the production of edible food supplements from the crops which is characterized by carrying out the following process steps or any combination of such process steps successfully, which process steps comprise:

Placing the root crop in a closed vessel, subjecting the root crop to chopping or cutting while evacuating the vessel.

Effecting a primary drying followed by an injection of an inert gas consisting of nitrogen or any gas thereinto, crushing the root crop, spraying a synergist onto the crushed mass, spraying a drying distillation extract thereonto, effecting a second drying of the resulting mass and mixing the mass to a dispersed state.

DETAILED DESCRIPTION OF PREFERRED EMBODIMENTS

Figure 1:
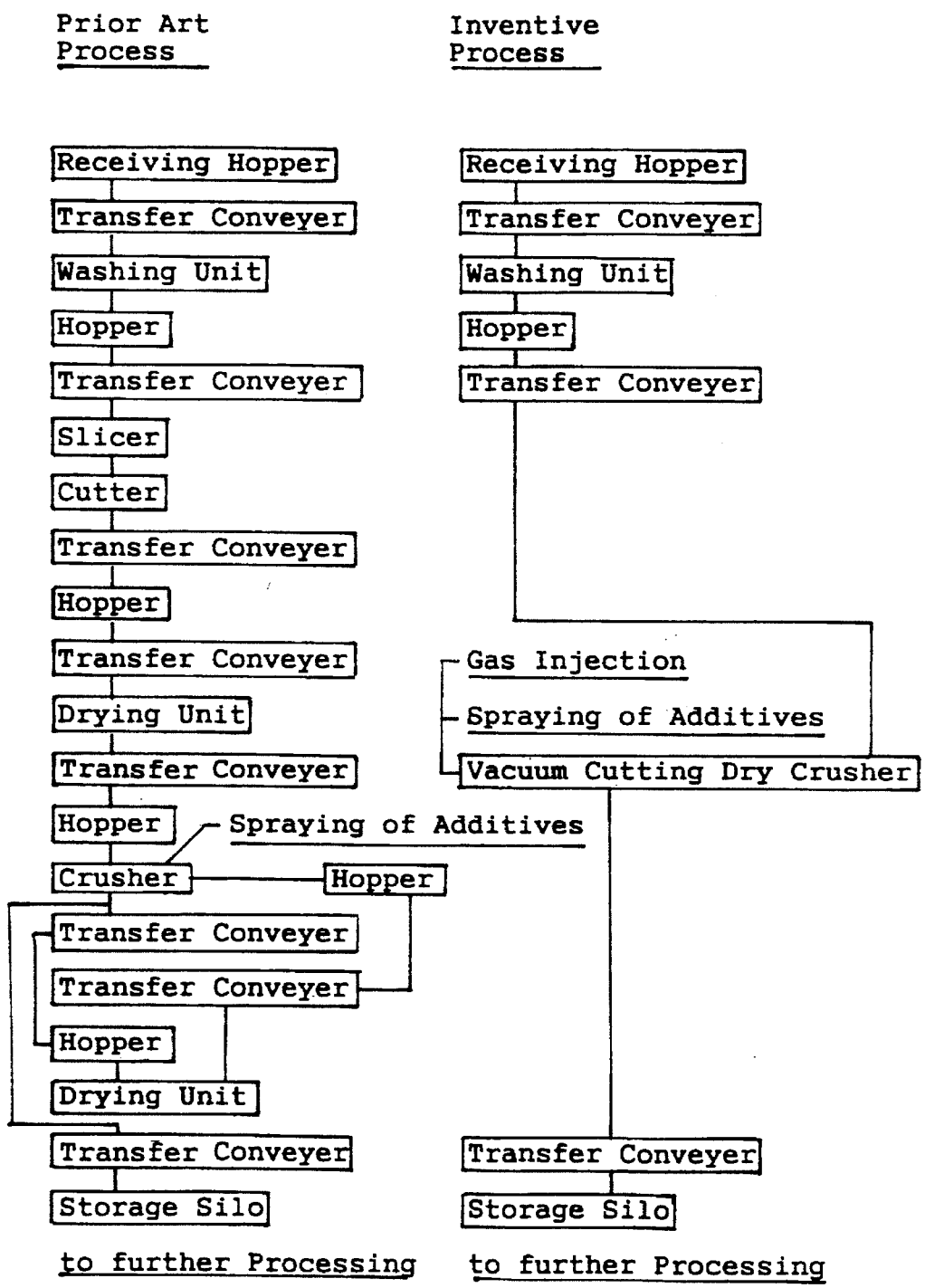
FIG. 1 shows a comparison of the flow chart of the process steps in the present invention and the prior art.
Figure 2:
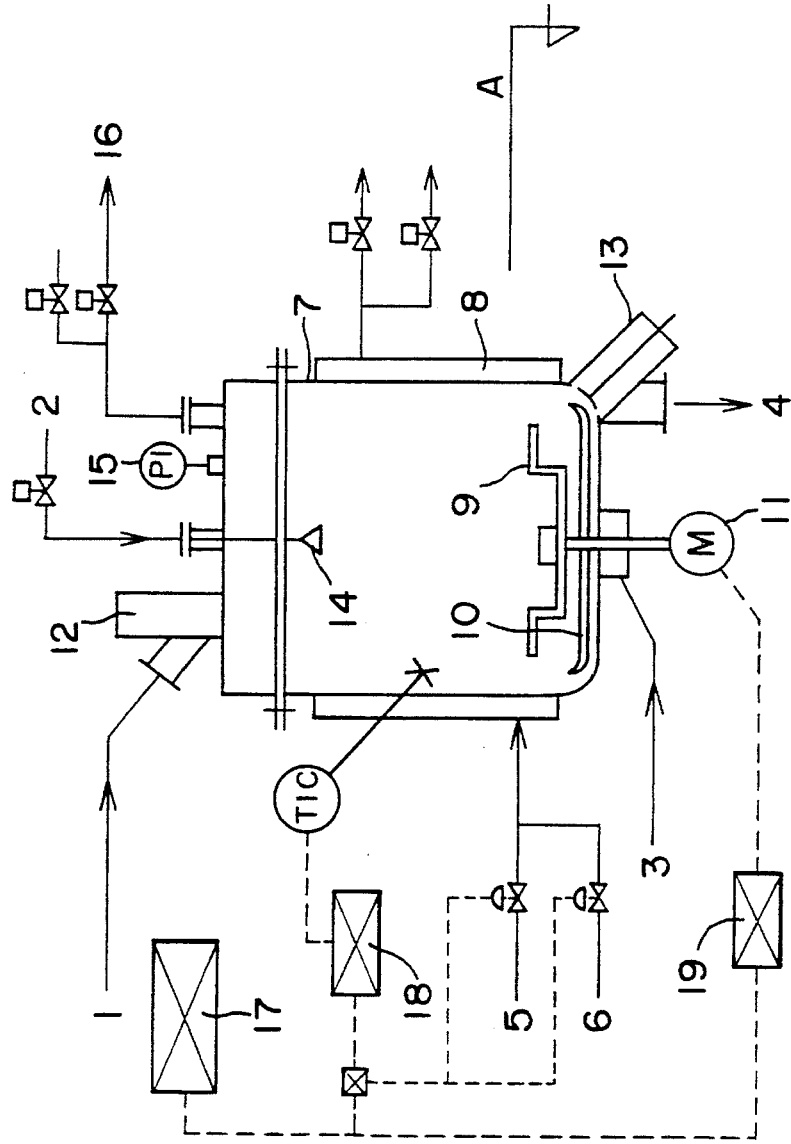
FIG. 2 is a schematic view illustrating an example of the processing vessel used according to the present invention.
Figure 3:
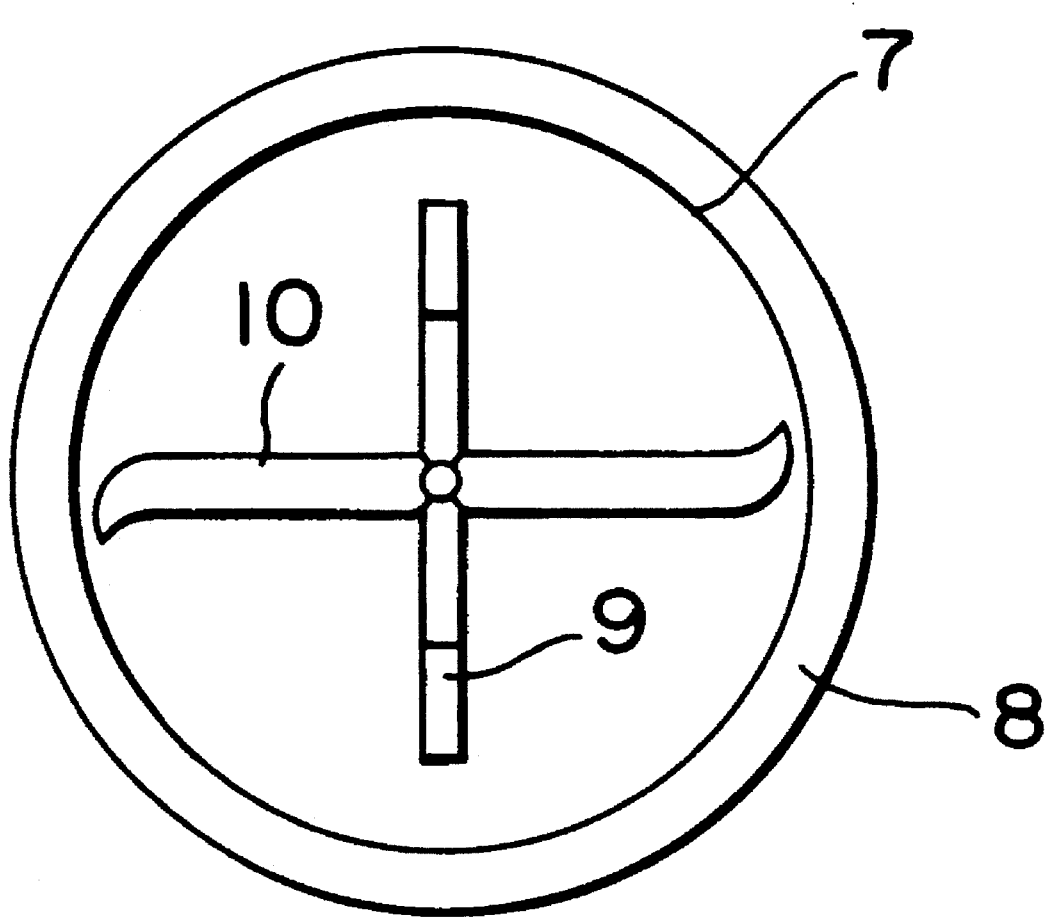
FIG. 3 is a sectional view of the vessel of FIG. 2 taken along the line A of FIG. 2.

In the context of this specification, the term "root crops" includes every vegetable having an edible root portion, for example, potatoes, sweet potatoes, taros, Japanese taro and the like among which, white potato is particularly adapted for the present invention. For such root crops, not only the tubers but also the petioles and stalks thereof are utilized, if necessary in combination therewith.

The root crops are charged into a closed vessel in the as-harvested form or in a nearly as-harvested form, wherein the root crops are preferably first cleaned by washing. It is permissible to charge the root crops into the vessel after they have been cut and/or dried and/or humidity-controlled. After the root crops have been charged into the vessel, all the processing operations are carried out in this vessel without the root crops being transferred to any other vessel.

The vessel, according to the present invention is furnished with mixing blades, heating means and a tightly closing lid that is designed to allow the degree of vacuum in the interior thereof to be controlled. Any mixing blade can be used, so long as such blades allow cutting, crushing and mixing of the loaded root crops, such as white sweet potato. For the heating means, a heating jacket surrounding the vessel can be employed. A heating medium, such as hot water or steam, is permitted to flow through the heating jacket. Alternatively, any other heat sources, such as a heater, can be used. For controlling the degree of vacuum within the vessel, a vacuum pump may be installed to evacuated the vessel, wherein the degree of vacuum would preferably be monitored by a vacuum gauge.

By the present invention, a process is contemplated for continuously processing raw material loaded into the vessel under the application of vacuum. The loaded raw material is processed first by cutting and then, by a primary drying, followed by an injection of inert gas, such as nitrogen, into the vessel. For the inert gas, carbon dioxide can be used, of course, an inert gas mixture composed of, for example, nitrogen and another inert gas may also be used.

When the loaded material is ready for pulverization due to the primary drying, the mixing blades are rotated at a high rate to effect the crushing of the load. As a counter measure for preventing the possible deterioration of the quality of the loaded material due to heat generation as a result of the crushing operation, it is preferable to carry out the crushing with cooling in such a manner, that a preliminary cooling of the charge is incorporated previously in the primary drying during its final stage by changing over the operation of the processing apparatus from the heating mode to the cooling mode, in order to limit the temperature of the load below a certain value.

Then, a synergist composed of organic acids such nitric acid, tartaric acid, ascorbic acid and so on and a dry distillation liquid extract are sprayed on the processed mass, followed by a second drying and subsequent dispersive mixing. Alternatively, it is permissible to incorporate a combination of the aforementioned operations in a continuous operation. For the dry distillation liquid extract, an extract of Camellia leaves is preferably used. By the spray addition of liquid additives, the crushed mass becomes crumbly or agglomerate, so that a further (second drying) and a further mixing (dispersive mixing) are incorporated in order to repulverize the mass.

In a preferred embodiment of the present invention, a starting root crop such as white sweet potato is charged into the processing vessel and the lid thereof is closed tightly. The vessel is evacuated using a vacuum up to a vacuum of 100–10 Torr, whereupon the mixing blades are rotated so as to cause a cutting of the loaded white sweet potato. This cutting operation is continued usually for a period of 5 to 6 minutes for general root crops, until the charged root crop is disintegrated into particles of the size of about 1 to 2 mm. The so disintegrated load is then subjected to a drying step (primary drying) while rotating the mixing blade at a circumferential velocity of 10 to 20 meters per second while heating at a heat source temperature of 25 to 50 degrees C. and at a temperature of the processed material of 25 to 30 deg. C. It is to be understood by those skilled in the art that the periods for the cutting and the drying can be different for each specific condition such as the raw material charged and so on. The same applies also to the duration of the subsequent crushing operation.

When the moisture content of the processed mass has reached a value of 7% to 15% by weight by the primary drying, the mixing blades are rotated at a high rate to effect crushing of the dried granular mass. It follows that the circumferential velocity of the mixing blades may be designed to be adjustable to cope with operational conditions for the steps of cutting, drying and crushing. The temperature of the processed materials during drying can be controlled by regulating the temperature of the heating source.

EXAMPLE 1

Experiment 1 for vacuum drying and pulverization of white sweet potato "Kusano #1"

A raw root crop material of Kusano #1 with the botanical name "Lpomea Batalas Lam" (A strain of white sweet potato registered according to the agricultural seeds and seedling law of Japan) in the as-harvested form with irregular sizes and shapes was loaded into a processing vessel after it had been washed with water, whereupon the processing steps of cutting, initial drying, injection of nitrogen gas, crushing of the dried cut mass, spraying liquid additives thereonto, second drying of the process mass and dispersive mixing of the redried mass were carried out in this vessel under a vacuum. Sampling of the material during processing was effected during each processing step by opening the vessel, together with a visual inspection of the processed material.

Separately therewith a parallel experiment was conducted in the same way but without incorporating the vessel opening procedures for the period of the processing steps from the cutting to the crushing steps, in order to examine the effect of air oxidation of the processed material on the material properties.

The following experimental conditions were employed:

| | |
|---|---|
| Capacity of the vessel | 20 liters |
| Charge amount of the crop material | 5 Kg |
| Temperature of the heat source | 25 to 55 deg. C. |
| Temperature of the crop material | below 30 deg. C. |
| Degree of vacuum | 20 to 30 Torr |

Revolution rate of the mixing blade

| | |
|---|---|
| during the cutting | 1170 rpm. |
| during the drying | 400 rpm. |
| during the crushing | 1170 rpm. |
| during the dispersive mixing | 400 rpm. |

Synergist used consisted of an aqueous mixture prepared by mixing to 1 liter of distilled water 15.5 g of tartaric acid, 80.0 g of citric acid. 112 g of honey with addition of other organic acid.

In an amount of 150 ml per 1 kg of the dry powder of the processed mass.

Dry distillation extract consisting of a liquor prepared by admixing to 1 liter of distilled water 30 ml of an extract of camellia leaves in an amount of 100 ml per 1 kg of the dry powder of the processed mass. Experimental results were as given below:

1. Cutting

A granular mass with particle sizes of 1 to 2 mm was obtained after a cutting period of 5 min.

2. Drying

The granular mass was dried up to a moisture content of 11% by weight after a drying period of 2 hours (See table 1 below)

TABLE 1

| Drying Time | Moisture content |
|---|---|
| 0 hours | 75.8% |
| 1 hour | 42.4% |
| 1.5 hours | 30.3% |
| 2 hours | 11% |

3. Crushing

A pulverized mass with particle size about 40 to 250 μm was obtained after a crushing period of 3 minutes.

4. Second drying after spraying of liquid additive

The drying of the sprayed mass was reached within 30 minutes with a drying characteristic nearly the same as that of the primary drying.

5. Dispersive mixing

The mixed mass became completely homogenous after a mixing duration of 3 minutes.

6. Air oxidation due to vessel opening procedure

The total time for the vessel to be left open was about 20 minutes or so and nevertheless, a clear difference in the hue of the product was recognized as compared with that in the comparison experiments without any vessel opening procedure. It was therefor made clear that material being processed should be protected against any contact thereof with air due to handling procedure as far as possible.

7. Analyzed composition of processed product

Composition of the resulting edible supplement was assessed as given in table 2 below, showing that valuable matters such as inorganic components and vitamins are retained in abundance.

8. Occurrence of objectionable odor

It was confirmed that an occurrence of a peculiar odor due to the injection of nitrogen gas is avoided by the spray addition of the dry distillation liquid extract.

TABLE 2

| | Inventive Product | Prior Art Product |
|---|---|---|
| Available energy | 220 Kcal | 301 Kcal |
| Water content | 12.2 g | 13.2 |
| Protein content | 3.4 g | 2.3 |
| Lipid content | 1.2 g | 0.9 g |
| Carbohydrate | | |
| Glucide | 76.7 g | 77.1 g |
| Fiber | 4.3 g | 3.6 g |
| Ash | 2.2 g | 2.9 g |

TABLE 2-continued

|  | Inventive Product | Prior Art Product |
|---|---|---|
| Calcium | 120 mg | 73 mg |
| Iron | 3.8 mg | 3.2 mg |
| Sodium | — | — |
| Potassium | 372 mg | 180 mg |
| Phosphorous | 89 mg | 77 mg |
| β-carotene | 436 μg | 268 μg |
| Vitamin A efficiency | 310 IU | 220 IU |
| Vitamin B 1 | 1.8 mg | 0.9 mg |
| Vitamin B 2 | 1.0 mg | 0.4 mg |
| Niacin | 4.2 mg | 2.3 mg |

EXAMPLE 2

Experiment 2 for vacuum drying pulverization of petioles of white sweet potato "Kusano #1"

A water washed raw material of petioles of the root crop Kusano #1 in the as harvested form with irregular sizes and shapes was discharged into a processing vessel, whereupon the processing of cutting, primary drying, injection of nitrogen, crushing of the dried cut mass, spraying of liquid additives thereonto, second drying of the processed mass and dispersive mixing of the redried mass were carried out in this vessel under a vacuum condition.

Sampling of the material during processing was carried out during each processing step by opening the vessel, together with a short inspection of the processed material.

Separately, a parallel experiment was conducted in the same manner but without incorporating the vessel opening procedure for the period of the processing steps from cutting to crushing in order to examine the effect of air oxidation of the processed material on the material properties.

The following experimental conditions were employed:

| Capacity of the vessel | 20 liters |
|---|---|
| Charged amount of the crop material | 4 kg. |
| Temperature of the heat source | 25–50 deg. C. |
| Temperature of the crop material | below 30 deg. C. |
| Degree of Vacuum | 20–30 Torr |

Revolution rate of the mixing blade

| during the cutting | 1000 rpm |
|---|---|
| during the drying | 350 rpm |
| during the crushing | 1170 rpm. |

Other conditions including spray of synergist and dry distillation liquid extract etc. were the same as in the experiment 1.

The experimental results were as given below:

1. Cutting

A nearly pasty mass was obtained after a cutting period of 5 min.

2. Drying

The pasty mass was dried up to a moisture content of 14% by weight after a drying period of 2 hours. (See table 3)

TABLE 3

| Drying time | Moisture cont. |
|---|---|
| 0 hr | 91.5% |
| 1 hr | 69.1% |
| 1.5 hr | 41% |
| 2 hr | 14.1% |

3. A pulverized mass with particle sizes of about 40–250 μm was obtained after a crushing period of 3 minutes.

4. Air oxidation due to vessel opening procedure

The total time for the vessel to be left open was 15 minutes or so and, nevertheless a clear difference in the hue of the product mass was recognized due to a little dark greening for the product with vessel opened as compared with the product of the comparison experiment without the vessel opening procedure. It was therefor evident that the material being processed should be protected against any contact thereof with air due to a handling procedure etc. as far as possible.

EXAMPLE 3

Experiment 3 for vacuum drying pulverization of stalks of white sweet potato "Kusano #1"

A water washed raw material of stalks of the root crop Kusano #1 in the as-harvested form with irregular sizes and shapes was charged into a processing vessel whereupon the processing steps of cutting, primary drying, injection of nitrogen gas, crushing of the dried cut mass, spraying of liquid additives thereonto second drying of the processed mass and dispersive mixing of the redried mass were carried out in this vessel under vacuum. Sampling of the material during processing was carried out during each processing step by opening the vessel, together with a visual inspection of the processed material.

Separately a parallel experiment was conducted in the same way but without the incorporation of the vessel opening procedures for the duration of the processing steps of cutting to crushing, in order to examine the effects of air oxidization of the processed material on the material properties.

The following experimental conditions were employed:

| Capacity of the vessel | 20 liters |
|---|---|
| Charged amount of the crop material | 4 kg |
| Temperature of the heat source | 25 deg C. |
| Temperature of the crop material | below 30 deg C. |
| Degree of Vacuum | 20–30 Torr. |

Revolution rate of the mixing blade:

| during the cutting | 1000 rpm. |
|---|---|
| during the drying | 350 rpm |
| during the crushing | 1170 rpm |

Other conditions including spray of synergist and dry distillation extract were the same as in experiment 1.

The experimental results are as given below:

1. Cutting

A nearly pasty mass was obtained after a cutting period of 5 minutes.

2. Drying

The pasty mass was dried to a moisture content 13% by weight after a drying period of two hours (See table 4 below)

TABLE 4

| Drying Time | Moisture cont. |
|---|---|
| 0 hr | 87.5% |
| 1 hr | 62.8% |
| 1.5 hr | 39% |
| 2 hr | 13.1% |

3. Crushing

A pulverized mass with particle sizes of about 40–250 μm was obtained after a crushing period of 3 minutes.

4. Air oxidation due to vessel opening procedure

The total time for the vessel to be left open was 15 minutes or so and, nevertheless a clear difference in the hue of the product was observed due to a little dark greening of the product with opening of the vessel, as compared with product of the comparison experiment without the vessel opening procedure exhibiting a faintly greenish yellow hue. It was therefor evident that the material being processed should be protected against any contact thereof with air due to a handling procedure as far as possible.

As described in detail above the process according to the present invention provides a series of inventive effects as follows:

1) It permits an integral processing of the raw material by carrying out the process steps, which comprise cutting the raw material effecting a primary drying of the so disintegrated material, injecting thereinto a gas for improving the product quality, crushing the so treated mass into a powdery form, adding thereto liquid additives for improving the product quality by spraying them on the pulverized mass, effecting a second drying of the resultant mass and mixing so as to disperse the dried mass, in one and the same processing vessel, whereby the number of devices and instrument for achieving these process steps can be dispensed with while simultaneously obtaining the exclusion of or the reduction of handling apparatuses therefor and the buffer tanks between such steps.

Moreover, the process according to the present invention brings about the following advantages:

A. Easier operational practices as compared with the prior technique due to the considerable reduction in the number of devices and instruments.

B. A reduction of labor requirements in daily maintainence operations and the cleaning of the installations, as compared with the prior techniques due to the considerable reduction in the number of devices and instruments.

C. A higher productivity as compared with the prior technique due to the lower frequency of the occurrence of troubles due to the considerable reduction of the number of devices and instruments (the devices for carrying out handling treatments that have no relation with the intrinsic performance of the process exhibit a higher frequency of breakdown)

D. A lower investment for installations, as compared with the prior technique due to the considerable reduction of the number of devices and instruments.

E. A smaller installation area, as compared with the prior technique due to the considerable reduction of the number of devices.

F. A lower cost for the maintainence and operation, as compared with the prior technique, due to a considerable reduction in the number of devices and instruments.

G. Avoidance of the adhesion of the processed material on the surfaces of the installations such as the intermediate apparatuses, as contrasted to the prior technique since all the processing steps are affected in one and the same vessel.

2. By achieving all of the processing operations during the exclusion of air, there is a prevention of deterioration of the product quality due to oxidization by the presence of air oxygen and processing while excluding pollutant bacteria in the air can be effectively attained in an economical manner under an aseptic and hygienic condition.

The technical measure for achieving the cutting and crushing of the raw material while excluding air is not a general practice in the prior art and it is still more difficult to attain the technical requirements for the exclusion of air from the device for handling the processed material or from the buffer tanks realistically.

By the aforementioned technical measure, a product having higher quality than those in the prior art can be obtained according to the present invention. Moreover, there is sufficient probability for obtaining a better quality according to the present invention than that obtained by any freeze drying technique, since conventional freeze drying cannot overcome the problem of air oxidation and dissipation of the valuable components in the atmosphere in the process steps of cutting and handling of the processed material.

According to the present invention, an improvement of the productivity and prevention of the deterioration of the product quality are achieved simultaneously by reducing the entire processing time from the raw material loading to the final mixing. For this, especially the drying periods are limited so as to preserve the requisite product quality.

4. Activation of the effective components and improvements of the property of being preserved can be attained to such a degree that penetration of the treating gas is facilitated by the injection thereof into the vessel maintained under vacuum. Thus the present invention permits the production of a product with better quality or if not, a product with at least comparable quality in a more economical manner.

5. A further contribution to the prevention of quality deterioration is attainable by achieving the processing operation in the crushing step with cooling of the processed material first by changing over the operation mode in the final stage of the forgoing drying step from heating mode into the cooling mode, in order to limit the temperature of the crushed mass below a certain permissible value for avoiding any quality deterioration due to heat.

6. A prompt evaporation of moisture is obtained while excluding oxidative deterioration of the product quality by crushing the granulated mass of the processed material under a reduced pressure to attain a larger specific surface area and to facilitate the evaporation of the solid surfaces.

In the prior art techniques it is usual to effect cutting of the initial root crop with sharp blades in such a manner that a product cut into a small diced shape is obtained so as not to lose the moisture content as well as the content of useful components as far as possible. There is a limitation of the size of the cut dice in view of the moisture loss and the cutting efficiency. Thus, the process according to the present invention can permit a prompter drying rate as compared with such prior techniques.

In addition the vacuum cutting technique according to the present invention is not a general practice and there is no large scale apparatus commercially available therefor, so that the prior cutting technique consists in a duplicate cutting to obtain the product in the form of a dice. Therefor, the practical manner of cutting in the process according to the present invention as a pretreatment for the subsequent drying is quite superior in view of the productivity and product quality when compared with the prior technique.

7. The process according to the present invention is also superior with regard to drying speed as compared with the prior technique. As for determining the speed for the step of drying, parameters for conducting heat to the material to be processed, namely heat transfer rate, evaporation rate and so on are to be considered. As for determining the step for the heat transfer rate, the temperature difference between the material to be processed and the heat source, heat conductivity, heat conducting surface area and so on are to be considered. Finally, as for determining the step for the evaporation rate, the temperature difference between the equilibrium temperature of the vacuum system and the temperature of the material to be processed should be considered as well as thermal conductivity, evaporation surface area, evaporation temperature and so on.

To achieve a higher drying rate and a higher heat transfer rate, it is necessary to increase the strength of the material against agitation so as to attain an increased frequency of contact of the material with a heating surface and an increased and refreshed effective surface area for evaporation.

By the process according to the present invention, it is permissible to use any root crop regardless of its size and shape and of the plant part including the stalks and the petioles, since all the process steps are attained in one and the same processing vessel. The process according to the present invention provides an edible food supplement preservative while retaining useful components, such as minerals, vitamins and inorganic components with larger amounts of micro components contributing to the preservability of food products without the preserved food being damaged by the process.

We claim:

1. A process for making preserved edible foods from a rootcrop by processing such rootcrop into a dry powder, the process comprising the steps of:

placing the rootcrop in a closable vessel;

subjecting the rootcrop to chopping or cutting while the vessel is evacuated;

drying the chopped/cut rootcrop by the application of heat thereto within the temperature range 25–55 degrees C. in order to remove moisture therefrom;

injecting an inert gas into the dried root crop;

crushing the rootcrop;

spraying an aqueous mixture of an organic acid onto the crushed mass; spraying a mixture of water and a leaf extract thereonto;

effecting a secondary drying of the resultant mass; and mixing the dried mass to a dispersed state.

2. A process as claimed in claim 1, wherein said rootcrop is a white sweet potato.

3. A process as claimed in claim 1 wherein said rootcrop comprises any plant portion selected from the group consisting of root parts, petioles, stalks and mixtures thereof.

4. A process as claimed in claim 1, wherein said rootcrop which is of irregular size and shape, is charged into the vessel in the as-harvested form or nearly as-harvested form with irregular sizes and shapes.

5. A process as claimed in claim 1, wherein said inert gas is carbon dioxide.

6. A process as claimed in claim 1, wherein said dried mass is cooled and then crushed.

7. A process as set forth in claim 1 wherein the process steps are carried out successively.

8. A process as set forth in claim 1 wherein the process steps are carried out in any order.

9. A process as set forth in claim 1 wherein the inert gas includes nitrogen.

* * * * *